United States Patent

Ando et al.

Patent Number: 5,938,898
Date of Patent: *Aug. 17, 1999

[54] FUNCTIONAL PRODUCT

[75] Inventors: Eiichi Ando, Yokohama, Japan; Koichi Suzuki, Bruxelles, Belgium; Junichi Ebisawa; Susumu Suzuki, both of Yokohama, Japan

[73] Assignee: Asahi Glass Company Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/425,490

[22] Filed: Apr. 20, 1995

Related U.S. Application Data

[62] Division of application No. 07/995,829, Dec. 23, 1992, abandoned.

[30] Foreign Application Priority Data

Dec. 26, 1991 [JP] Japan ................................ 3-357811

[51] Int. Cl.$^6$ .................................................. C23C 14/34
[52] U.S. Cl. ............................... 204/192.23; 204/192.12; 204/192.15; 204/192.26; 204/192.27; 204/192.28
[58] Field of Search ..................... 204/192.12, 192.15, 204/192.23, 192.26, 192.27, 192.28

[56] References Cited

U.S. PATENT DOCUMENTS

| 4,978,437 | 12/1990 | Wirz ............................. 204/192.26 X |
| 5,009,761 | 4/1991 | Robinson ....................... 204/192.26 X |
| 5,110,637 | 5/1992 | Ando et al. . |
| 5,264,286 | 11/1993 | Ando et al. . |
| 5,399,435 | 3/1995 | Ando et al. . |

FOREIGN PATENT DOCUMENTS 0331201  9/1989  European Pat. Off. .

OTHER PUBLICATIONS

J. Vossen et al., "Thin Film Process", Academic Press, 1978, pp. 14–16.

*Primary Examiner*—Nam Nguyen
*Assistant Examiner*—Steven H. VerSteeg
*Attorney, Agent, or Firm*—Oblon, Spivak, McClelland, Maier & Neustadt, P.C.

[57] ABSTRACT

A functional product comprising at least one layer of a thin film having a function formed above a substrate; and at least one layer of an oxide film whose major component is an oxide containing tin and silicon, formed above the substrate.

22 Claims, 2 Drawing Sheets

FUNCTIONAL PRODUCT

This is a Division of application Ser. No. 07/995,829 filed on Dec. 23, 1992 now abandoned.

BACKGROUND OF THE INVENTION

1. Field of the Invention

The present invention relates to a functional product, particularly to a functional product excellent in durability and appearance.

2. Discussion of Background

Conventionally, a Low-E glass (low emissivity glass), or a heat ray shielding glass (normally called a heat ray reflecting glass) wherein a multi-layer film is formed on a glass substrate having a large area by the magnetron sputtering method, has been employed. Since the glass employed in construction is excellent in energy conservation effect and design performance, it has considerably been prevailing in recent years.

As a use of the low emissivity glass which requires high durability, a window glass for an automobile is pointed out. In case of the window glass for an automobile, in recent years, the glass area in use has been increasing. For maintaining and promoting the comfort within an automobile, the low emissivity glass is beginning to be in use. In an automobile, it is required that the transmittance thereof is high and the reflection factor thereof is low in view of safety.

Especially, in an automobile, it is obligated by law that the visible light transmittance is not smaller than 70%. Furthermore, with respect to a reflection color thereof, a color tone caused by interference is not preferred and it is necessary to have an appearance as neutral as possible (an appearance similar to a normal uncoated glass).

The Low-E glass made by a sputtering method, is normally composed of three layers of an oxide film/a silver film/an oxide film. Since this type of Low-E glass employing silver, has a problem in durability, it cannot be employed in a single plate glass, and is used in a form of double glazing or laminated glass. For a windshield glass and a rear glass of an automobile, a low emissivity glass coated with a three-layer film composed of zinc oxide film/silver film/zinc oxide film made by a sputtering method on the side of a surface thereof for adhesion to form a laminated glass, is reduced into practice.

In the low emissivity glass of a single plate made by a sputtering method, a multi-layer film having two or three layers is formed by combining one layer selected from a metal film or a nitride film, and an oxide film or oxide films of tin oxide or titanium oxide. A reflection color tone generated by the necessary transmittance and optical interference is realized by pertinently controlling the film thickness. The low emissivity shielding glass having a high transmittance and a low reflection factor can be obtained by composing three layers of an oxide film/a nitride film/an oxide film, selecting the film material and controlling the film thicknesses. However, in case of a conventional film material, the function is not sufficient for the use of an automobile wherein high durability is necessary. Furthermore, since the conventional film material shows a reflection color generated by the optical interference, an improvement is required for the use of an automobile wherein a neutral color tone is necessary.

On the other hand, in case of a low emissivity glass in a single plate form, coated with an oxide film such as a titanium oxide film utilizing thermal decomposition, or a Low-E glass coated with an electrically conductive tin oxide, the reflection factor thereof is comparatively high and the durability thereof is not sufficient, which is not suitable for a low emissivity glass for the use of a door glass of an automobile.

A tempered single plate glass is employed for the door glass of an automobile in view of the strength. Therefore, the low emissivity film for that purpose requires high durability and a neutral color tone. A low emissivity film made by titanium nitride or the like coated with a composite oxide film as a protective film containing at least one selected from the group consisted of silicon and boron, and zirconium having high durability, is reduced to practice for that usage. This single plate low emission glass is excellent in durability and color tone. However, it is desirable to further promote the heat ray shielding function.

On the other hand, in case of a low emissivity glass composed of three layers wherein a low emissivity film made by titanium nitride or the like, is sandwiched by composite oxide films containing at least one selected from the group consisted of silicon and boron, and zirconium, having a high durability, it is possible to obtain the heat ray shielding film having a neutral color tone and excellent in heat ray shielding function, by controlling the content of silicon or boron and optimizing the refractive index. However, in case of the composite oxide film containing at least one selected from the group of silicon and boron, the film forming rate is low, the productivity is poor and a sintering hot press should be employed at elevated temperature to make a sputtering target, which increases the material cost. This was the hazard for the reduction into practice.

On the other hand, in case of a low emissivity glass for construction, there is no restriction of the neutral color as in the use for an automobile, and the specification thereof concerning the durability is rather alleviated. However, in the conventional low emissivity glass, the mechanical strength of the film is insufficient and the film is apt to be scratched. The scratch is often and mainly caused by carelessness in handling thereof. It is possible that the scratch is caused at every occasion including the production, the transportation, in construction of a building and in cleaning a window glass. The scratch in production gives rise to lowering of yield of product. The scratch in transportation, construction and cleaning thereof gives rise to claims for products.

To solve such a problem, it is considered to overcoat a metal oxide film which is hard, having a low coefficient of friction of surface, on the film of the conventional product. The overcoating material should be provided with a low coefficient of friction of surface and small refractive index to minimize the change of the color tone by the overcoating. Conventionally, as such a material, a composite oxide film is known which contains at least one selected from the group consisted of silicon and boron, and zirconium. However, as stated above, this material has drawbacks wherein "arcing" is apt to be generated in forming film, the film forming rate is low and the material cost is expensive.

SUMMARY OF THE INVENTION

It is an object of the present invention to solve the problem of the conventional technology wherein, when the heat shielding function is emphasized, the deviation of the color tone from a neutral one is enlarged which is not suitable for appearance, whereas, when the color tone is emphasized, the heat shielding function is deteriorated, and to provide a low emissivity glass which is excellent in the film forming rate, wherein the material cost is reduced to a low value, and which is inexpensive and excellent in the heat shielding function and the durability.

It is another object of this invention to provide a low emissivity glass for construction usage wherein durability thereof is enhanced, and particularly a low emissivity glass having color tone the same with that of conventional one wherein only mechanical durability is enhanced.

According to an aspect of the present invention, there is provided a functional product comprising:

at least one layer of a thin film having a function formed above a substrate; and at least one layer of an oxide film whose major component is an oxide containing tin and silicon, formed above the substrate.

FIGS. 1 through 4 are sectional diagrams of Examples of a functional product of this invention. However, this invention is not necessarily restricted to these Examples. A reference numeral 1 designates a transparent substrate such as glass or plastic, 2, an oxide film whose major component is an oxide containing tin and silicon, 3, a thin film having a function (hereinafter, called a functional film) and 4, an oxide film whose major component is an oxide containing tin and silicon. A reference numeral 5 designates a chemicalproof protective film.

The oxide films of 2 and 4 (hereinafter, may be called transparent oxide films), may be provided with an oxide containing tin and silicon as the major component, or may contain other elements such as zirconium, titanium, tantalum, bismuth and the like. Although the ratio of silicon as compared to tin is not particularly restricted, the ratio of tin is to be 5 through 95% in atomic ratio, preferably 30 through 90%, particularly 40 through 90%, with respect to a total amount of tin and silicon.

When the ratio of tin is too small, since the refractive index is too low, the effect of optical interference is lowered and in correspondence therewith the heat shielding function is also lowered. Furthermore, when the film is formed by a direct current sputtering method in a large area, "arcing" is apt to be generated and, therefore, the applied power is restricted. Therefore, the film forming rate is also lowered, which deteriorates the productivity. When the amount of tin is too large, the refractive index does not decrease so much, the optical interference color becomes conspicuous and the neutral appearance cannot be obtained. Furthermore, change of the color tone becomes conspicuous when the film is overcoated.

The refractive indices of the transparent oxide films 2 and 4, can mainly be controlled by the composition of the target, since the refractive indices depend on the composition of tin and silicon of the target and the sputtering condition. The refractive index of the transparent oxide film of this invention whose major component is tin and silicon can be controlled in a range of 1.5 through 2.0.

In case of the optical interference film having composition of three layers such as that of an oxide film/a nitride film/an oxide film, when the refractive index is too low, the effect of interference is lowered, and the promotion of the heat ray shielding function is restrained. When the refractive index is high, the interference effect is increased and the heat ray shielding function is promoted. However, the reflection color by the interference becomes conspicuous. The refractive indices of the transparent oxide films 2 and 4 are to be in a range of 1.6 through 2.0, preferably 1.7 to 1.9, and particularly 1.75 through 1.85, when the film is applied to a window glass of an automobile, since a neutral reflection color is preferred.

The film thicknesses of the oxide films of 2 and 4 are not particularly restricted. However, the film thicknesses each is necessary to be equal to or more than 50 Å to provide a sufficient scratch resistance (in Taber wear). The scratch resistance is promoted in accordance with increase of the film thickness. The necessary and sufficient scratch resistance can be obtained by the film thickness of approximately 400 Å through 800 Å. In case of a film composition of an oxide film/a nitride film/an oxide film, having a function as an optical interference film, the film thicknesses of the films 2 and 4 are necessary to be approximately 400 Å through 1,000 Å, respectively, although depending on the refractive indices. The film thickness should be determined in consideration of reflective color tone, transmittal color tone, or a shift of interference color to the side of short wavelength of light when the film is viewed sideways. The reflection color in a range from red to yellow region is not preferred for a window glass of an automobile. Therefore, for this usage, the film thicknesses are to be equal to or more than 600 Å, respectively, preferably equal to or more than 700 Å, and particularly approximately in a range of 800 Å through 1,000 Å.

Furthermore, when the oxide film 4 is employed as a protective film for use of construction having scratch resistance (FIG. 3), the effect of improving the scratch resistance is recognized to some degree even with the film thickness of 10 Å. The thicker the film thickness of the oxide film 4, the more enhanced the scratch resistance. However, when the film thickness is too thick, the change of the color tone becomes conspicuous. Accordingly, the film thickness of the overcoating is pertinently to be 10 through 100 Å.

Although there is no particular restriction for the functional film 3, a film whose major component is at least one selected from the group consisted of a nitride, a carbide, a metal and an absorptive oxide, or a composite film composed of the above film and other film, or the like, is pointed out. In case wherein light in the visible region is to be transmitted as much as possible and light in infrared region is to be restrained as for the transmittance as much as possible, or in case of providing a wavelength selecting property of the transmittance, a film whose major component is a nitride is preferable. A nitride film, an oxinitride film, a carbonitride film, or a nitride film containing oxygen and carbon or the like, containing at least one selected from the group consisted of titanium, zirconium, hafnium and chromium is preferable. Among these, nitride films of titanium and zirconium are especially excellent.

The film thickness of the functional film 3 is not particularly restricted and should be determined in consideration of desired transmittance, reflection factor, color tone or the like. In case of an automobile, especially a passenger car, the visible light transmittance is restricted to be equal to or more than 70%. Therefore, although depending on the kind of substrate glass and the kind of functional film, in case of a nitride film, the film thickness of the functional film 3 is to be approximately 20 through 100 Å.

It is preferable to form the chemicalproof protective film 5 for a use wherein it is necessary to promote further durability against chemicals, particularly stability against alkalis. An oxide film containing at least one of silicon and boron, and zirconium or a tantalum oxide film is preferable for the film 5. Although there is no restriction for the film thickness, when it is too thin, the effect of the protective film against chemicals is not sufficient. Therefore, the film thickness is to be equal to or more than 20 Å, preferably equal to or more than 30 Å. To promote the scratch resistance, the film thickness is necessary to be equal to or more than at least 50 Å. On the other hand, when the film thickness is too thick, there is the effect of the optical interference. Therefore, for the use wherein the neutral color tone is necessary such as in an automobile, the film thickness is to be equal to or less than 500 Å, preferably equal to or less than 300 Å, and particularly equal to or less than 200 Å.

In this specification, the expression that the color tone is neutral, indicates that the color observed by human eyes is neutral, in principle. In expressing the "neutral" by numerical values, it is preferable that a change of the reflection color tone (CIE calorimetric display) on the side of glass face of glass formed with the film, are compared to the reflection color of glass not formed with the film, is approximately $\Delta X \leq 0.02$ and $\Delta Y \leq 0.02$. A reddish or yellowish reflection color tone is not preferable. The change of the reflection color tone on the side of a surface of glass formed with the film may be provided with a value larger than the change of the reflection color tone on the side of the glass face not formed with the film, so far as the reflection color tone is not reddish or yellowish.

As the heat ray shielding function of the functional product having the heat ray shielding function of this invention, it is preferable that the solar ray transmittance is reduced by 8% or more, particularly 10% or more as compared to that before forming the film. Furthermore, Examples are shown in cases of a film of two layers, a film of three layers and a film of four layers as the construction of this invention. However, this invention is not necessarily limited to these Examples. An interface layer for promoting adhesive strength between the substrate and the film or between layers, may be inserted. Or, a layer which prevents optical reflection, may be provided.

The oxide film of this invention whose major component is an oxide containing tin and silicon, is preferably produced by a reactive sputtering method in an atmosphere of oxygen, employing a target wherein tin and silicon are solidified by the CIP method (cold isostatic press method) in view of the production efficiency. However, this invention is not restricted by this production method. The film may be formed from a target of a mixed oxide of tin oxide and silicon oxide. The production may be performed by the vacuum evaporation method, the ion plating method, the CVD method or the like.

When the oxide film of this invention whose major component is an oxide containing tin and silicon, is formed by the reactive sputtering method employing a metal target, the film forming rate is fast compared with that of an oxide film whose major component is an oxide containing zirconium and silicon. For instance, with the same power density applied to a target, in contrast to the case wherein the oxide film is formed by employing Zr—Si (atomic ratio 1:2) target, in case of forming an oxide film by employing a Sn—Si (atomic ratio 1:1) target, the film forming rate is about 2.5 times as fast as the former, and in case of employing a Sn—Si (atomic ratio 8:2) target, about 2.6 times as fast as the former one.

Actually, in case of the Zr—Si series target, a large power density cannot be applied thereto due to "arcing" or the like. Therefore, in case of the Sn—Si series target, a power density approximately 1.6 times as much as that in the Zr—Si series target, can be applied. Accordingly, when power as large as possible is applied to a target, the film forming rate employing the Sn—Si series target is about four times as much as that employing the Zr—Si series target, which is extremely effective in view of the production efficiency. In case of forming a multi-layer by combining the film with a thin film having a function, although depending on the construction of a total of the multi-layer, the film forming rate as a total is approximately doubled.

This invention provides a functional product having a neutral color tone by having a tin oxide film containing silicon, and by lowering the refractive index.

Moreover, the hardness of the film increases by containing silicon. This invention provides a functional product wherein the change of the color tone is reduced and the durability thereof is enhanced by employing the film as a protective film.

The electrically conductive nitride film such as a titanium nitride film, increases the reflection factor thereof in near infrared ray region with increase of the film thickness. Accordingly, it is employed as a low emissivity film having a wavelength selecting property. On the other hand, the transmittance in the visible ray region is decreased by increase of the film thickness. Therefore, in case of a window for an automobile having restriction in the visible light transmittance, the film thickness has a limitation. Although depending on the kind of the substrate glass, the film thickness is approximately 10 through 20 Å.

It is necessary to increase the thickness of the nitride film as much as possible to promote the heat ray shielding function (the wavelength selecting property of the transmittance). For that purpose, a method may be considered wherein the nitride film is sandwiched by transparent oxide films having comparatively high refractive indices, thereby preventing the reflection of the visible light. The nitride film can be made thick in accordance with the increase of the visible light transmittance for the reflection prevention, which improves the heat ray shielding function as a result.

On the other hand, due to dispersion of the refractive index in regard to the wavelength, of the nitride film, it is not possible to provide the reflection prevention in the whole visible light region. Accordingly, irrespective of how to choose a designed median of wavelength for the reflection prevention in the visible light region, the reflection light is deviated from the neutral color tone. Furthermore, the higher the refractive index of the transparent oxide films for the reflection prevention, the higher the excitation purity of the reflection color. It is necessary to improve the film quality of the nitride film or to decreases the refractive index of the transparent oxide film for interference, to decrease the excitation purity by making the reflection color as neutral as possible.

However, in the normal sputtering method, the improvement of the film quality of the nitride film is difficult. In decreasing the refractive index of the transparent oxide film, when the refractive index is too small, the effect of optical interference is decreased and the effect of the reflection prevention is not present. As a result, the promotion of the heat ray shielding function cannot be expected. Accordingly, to obtain a functional product having the neutral color tone and wherein the heat shielding effect is promoted, the refractive index of the transparent oxide film is to be in a range of 1.6 through 1.9.

The refractive index of the film is determined by the film material and its density. In coating the film in a large area, the sputtering method is normally employed since the uniformity of film thickness is excellent. A direct current sputtering method is employed in a film forming method for a large area. The oxide film is formed by a reactive sputtering employing a metal target mainly of zinc, tin, titanium or the like. Since the refractive index of the oxide film is high which is equal to or more than 2.0, the refractive index should be decreased to obtain the neutral color tone in the film composition of three layers of an oxide film/a nitride film/an oxide film.

As an oxide film having the refractive index of 1.6 through 1.9, one made by alminium oxide is pointed out. It is not always easy to form the alminium oxide by performing a reactive sputtering of alminium by a direct current, due to the generation of arcing. Furthermore, there is a problem in the chemicalproof performance of the material per se. Other than alminum oxide film, an oxide film containing silicon and aluminum, a sialon (SiAlON) film, an oxinitride film of silicon (SiON), an oxide film containing zirconium and silicon or boron or the like may be pointed out. The film containing aluminum has a problem in the chemicalproof performance. In case of SiON, the direct current sputtering is difficult to perform. In case of the oxide film containing zirconium and silicon or boron, there is a problem in productivity since the film forming rate is slow.

No oxide film has currently been discovered which is composed of a single component and which is a stable oxide film, wherein the film forming rate is fast and the refractive index is in a range of 1.6 through 1.9. A composite oxide film may be considered wherein materials having high refractive indices such as titanium, zinc, tantalum, zirconium, tin, bismuth or the like and materials having low refractive indices such as boron or the like, are combined, to obtain the oxide film having the refractive index of the above range.

Among the materials having high refractive indices, in case of titanium and tantalum, the film forming rate is low. In case of zinc, the film forming rate is high, however, there is a problem in the chemicalproof performance. In this invention, tin having a high film forming rate is selected as a base material and silicon is selected for the purpose of decreasing the refractive index.

DETAILED DESCRIPTION OF THE PREFERRED EMBODIMENTS

Figure 1:
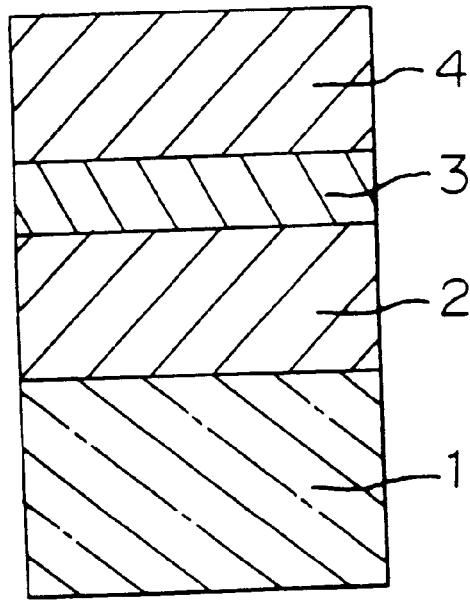
FIG. 1 is a sectional diagram of an example of a functional product of this invention.
Figure 2:
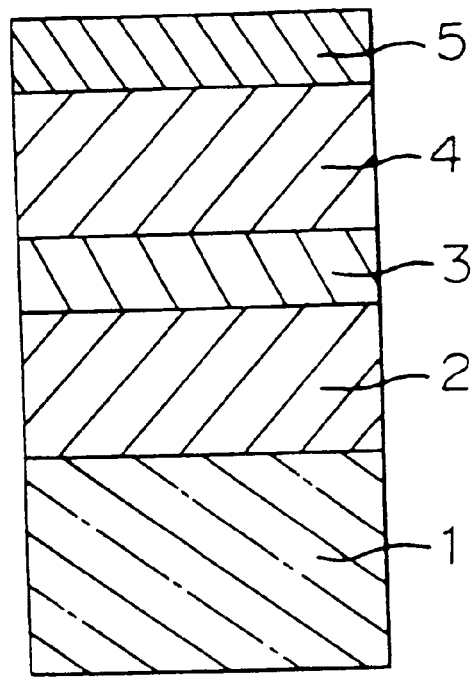
FIG. 2 is a sectional diagram of another example of a functional product of this invention.
Figure 3:
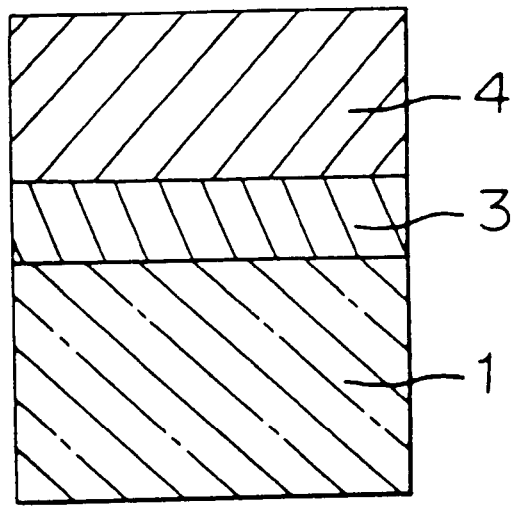
FIG. 3 is a sectional diagram of another example of a functional product of this invention.
Figure 4:
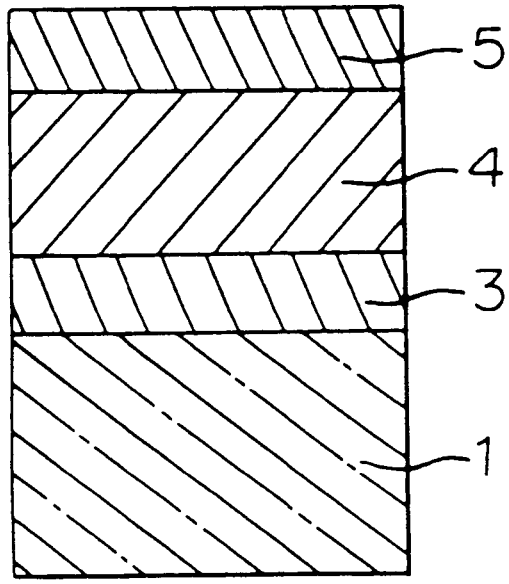
FIG. 4 is a sectional diagram of another example of a functional product of this invention.

Now, the present invention will be described in further detail with reference to Examples. However, it should be understood that the present invention is by no means restricted to such specific Examples.

EXAMPLE 1

A washed bronze glass plate having thickness of 4 mm is set in a sputtering device. The air in the device is discharged with pressure down to $10^{-6}$ Torr. Next, a mixed gas of argon and oxygen (flow quantity ratio 1:9) is introduced in the device thereby elevating the pressure to $2\times10^{-3}$ Torr. Sputtering is performed employing an alloy target of tin and silicon (80:20 in atomic ratio) with the power density of 7.8 W/cm$^2$, thereby forming an oxide film containing tin and silicon (Sn:Si=80:20 in atomic ratio) (first layer) having the refractive index of 1.85 by approximately 800 Å.

A titanium nitride film (second layer) was formed by approximately 60 Å by sputtering a titanium target with the power density of 7.8 W/cm$^2$, wherein the sputtering gas is switched to a mixed gas of argon and nitrogen (flow quantity ratio 3:1), maintaining the degree of vacuum at $2\times10^{-3}$ Torr. An oxide film containing tin and silicon (Sn:Si=80:20 in atomic ratio) (third layer) was formed by approximately 800 Å under the same condition as in the first layer after the sputtering gas is again switched to a mixed gas of argon and oxygen (flow quantity ratio 1:9) under $2\times10^{-3}$ Torr.

The visible light transmittance of the low emissivity glass having construction of three layers obtained as above, was 70%. The solar ray transmittance thereof is reduced by approximately 12% compared with that before forming the film. In expressing the change of the reflection color tone of the glass surface not coated with the film, $\Delta X$ was $-0.0337$ and $\Delta Y$ was $-0.0246$. The change of the reflection color tone of the surface wherein the film was formed (hereinafter, called coated surface), was a value wherein $\Delta X=-0.0779$ and $\Delta Y=-0.0801$. Since the reflection color tone is of blue region, there is no strange feeling as glass for use of an automobile or the like. Furthermore, the change of the reflection color when viewed sideways, was not of red region and was good. The change of the visible light transmittance after the sample underwent Taber test wherein the sample received 1,000 Taber rotations of the abrasive wheels CS-10F under a load of 500 g, was as small as $-1.4\%$.

EXAMPLE 2

A washed gray glass plate having thickness of 4 mm, was set in a sputtering device, and a film of three layers wherein only the thickness of a titanium nitride film of the second layer in Example 1 was changed to 45 Å and the residual composition was the same with that in Example 1. The visible light transmittance of the low emissivity glass having composition of three layers, was 70%. The solar ray transmittance thereof was reduced by approximately 8.5% compared with that before forming the film.

In expressing the change of the reflection color tone of the glass surface, $\Delta X$ was $-0.0155$ and $\Delta Y$ was $-0.0106$. The change of the reflection color tone of the coated surface was a value wherein $\Delta X=-0.0382$ and $\Delta Y=-0.0129$. Since the film is provided with the reflection color tone of blue region, it has is no strange feeling as glass for use of an automobile or the like.

EXAMPLE 3

A washed bronze glass plate having thickness of 4 mm, was set in a sputtering device, and a low emissivity glass having composition of three layers similar to that in Example 1, was made. However, the thickness of the second layer of a titanium nitride film was approximately 60 Å, and as for the first layer and the third layer, oxide films containing tin and silicon (Sn:Si=67:33 in atomic ratio) having the refractive index of 1.75, were formed by approximately 930 Å by sputtering an alloy target of tin and silicon (67:33 in atomic ratio).

The visible light transmittance of the low emissivity film having composition of three layers, was 70%. The solar ray transmittance thereof was reduced by approximately 11.4% compared with that before forming the film. In expressing the change of the reflection color tone of the glass surface by CIE calorimetric display, $\Delta X$ was 0.0026 and $\Delta Y$ was 0.0069. The reflection color of the glass surface was extremely neutral. The reflection color of the coated surface was of blue region, and the change of the color tone was a value wherein $\Delta X=-0.0189$ and $\Delta Y=-0.0593$.

EXAMPLE 4

A washed bronze glass plate having thickness of 4 mm, was set in a sputtering device, and a low emissivity glass having composition of three layers similar to that in Example 1, was made. However, the film thickness of the second layer of a titanium nitride film was approximately 60 Å, and as for the first layer and the third layer, oxide films containing tin and silicon (Sn:Si=50:50 in atomic ratio) having the refractive index of 1.69, were formed by approximately 930 Å by sputtering an alloy target of tin and silicon (50:50 in atomic ratio).

The visible light transmittance of the low emissivity glass having composition of three layers, was 70%. The solar ray transmittance thereof was reduced by approximately 9.3% compared with that before forming the film. In expressing the change of the reflection color tone of the glass surface by CIE calorimetric display, ΔX was 0.0078 and ΔY was 0.0061. The reflection color of the glass surface was extremely neutral. The change of the reflection color tone of the coated surface was a value wherein ΔX=−0.0177 and ΔY=−0.0388, and the reflection color tone was of blue region.

The change of the visible light transmittance wherein the sample underwent Taber test in which the sample received 1,000 Taber rotations of the abrasion wheels CS-10F under a load of 500 g, was as small as −1.1%. The changes of the visible light transmittance of the samples after they were immersed in 0.1 normal sulfuric acid and NaOH at 50° C. for 24 hours, were respectively increase by 1.3% and decrease by 3.9%. The film was provided with practically sufficient wear resistance and chemicalproof performance.

EXAMPLE 5

A washed bronze glass having a thickness of 4 mm, was set in a sputtering device, and a low emissivity glass having composition of three layers similar to that in Example 1, was made. However, the film thickness of the second layer of the titanium nitride film was approximately 60 Å, and as for the first layer and the third layer, oxide films containing tin and silicon (Sn:Si=50:50 in atomic ratio) having the refractive index of 1.69, were formed by approximately 870 Å by sputtering an alloy target of tin and silicon (Sn:Si=50:50 in atomic ratio).

The visible light transmittance of the low emissivity glass having the construction of three layers, was 70%. The solar ray transmittance thereof was reduced by approximately 10% compared with that before forming the film. In expressing the change of the reflection color tone of the glass surface by CIE calorimetric display, ΔX was 0.0110 and ΔY was 0.0072. The color tone of the glass surface was extremely neutral. The change of the reflection color tone of the coated surface was a value wherein ΔX=−0.0142 and ΔY=−0.0376, and the reflection color tone was of blue region.

The change of the visible light transmittance wherein the sample underwent Taber test wherein the sample received 1,000 Taber rotations of the abrasion wheels CS-10F under a load of 500 g, was as small as −1.1%. The changes of the visible light transmittance after the samples were immersed in 0.1 normal sulfuric acid and NaOH at 50° C. for 24 hours, were respectively increase by 1.2% and decrease by 5.4%. The film was provided with practically sufficient wear resistance and chemicalproof performance.

EXAMPLE 6

A washed bronze glass having thickness of 4 mm, was set in a sputtering device, and a film of three layers similar to that in Example 5, was made. However, the film thickness of the second layer of the titanium nitride film was about 50 Å, and as for the first layer and the third layer, oxide films containing tin and silicon (Sn:Si=50:50 in atomic ratio) having the refractive index of 1.69, were formed by approximately 870 Å by sputtering an alloy target of tin and silicon (50:50 in atomic ratio).

Thereafter, a low emissivity glass having of four layers was made wherein an oxide film containing zirconium and silicon (Zr:Si=1:2 in atomic ratio) having the refractive index of 1.7, was formed by 50 Å by introducing a mixed gas of argon and oxygen (flow quantity ratio 7.3), employing an alloy target of zirconium and silicon (1:2 in atomic ratio), and by performing the sputtering with the power density of 9.4 W/cm$^2$.

The visible light transmittance of the low emissivity film having composition of four layers, was 72%. The solar ray transmittance thereof was reduced by 7.8% compared with that before forming the film. In expressing the change of the reflection color tone of the glass surface by CIE calorimetric display, ΔX was 0.0056 and ΔY was −0.0013. The color tone of the glass surface was extremely neutral. The change of the reflection color tone of the coated surface was a value wherein ΔX=−0.0132 and ΔY=−0.0417, and the reflection color tone was of blue region.

The change of the visible light transmittance after the samples were immersed in 0.1 normal sulfuric acid and NaOH at 50° C. for 24 hours, were respectively increase by 1.0% and decrease by 0.4%. The alkali resistance of the film is considerably promoted compared with that in Example 5.

A similar alkali resistance test was performed on samples wherein the thickness of the protective oxide film of the fourth layer was varied by 25, 75 and 100 Å. The alkali resistances of these samples were improved similar to the sample having the film thickness of 50 Å. Furthermore, in case of an oxide film containing zirconium and boron (target film composition: Zr:B=7:3 in atomic ratio) instead of the oxide film containing zirconium and silicon, or a tantalum oxide film, as protective films, the chemicalproof performances thereof were similarly promoted.

EXAMPLE 7

A titanium nitride film was formed by approximately 100 Å on a washed clear glass having a thickness of 2 mm, under the same condition as in Example 1. Next, four kinds of low emissivity glass were made wherein oxide films containing tin and silicon (target and film composition: Sn:Si=80:20) were formed as protective oxide films having thicknesses of 0, 100, 200 and 400 Å, under the same conditions as in Example 1.

The samples underwent Taber wear test under the same condition as in Example 1. The changes of transmittance thereof after approximately 1,000 Taber rotations were respectively increased by 4.3, 3.1 and 1.2% in the samples having the protective oxide films having thicknesses of 100, 200 and 400 Å, all of which were improved compared with the increase by 6% or more in case of that without protective oxide film.

As for the alkali resistance of the samples of dual layer construction in this Example, similar to that in Example 6, there was an improvement in a composite oxide film containing at least one of silicon and boron, and zirconium, or by protectively coating tantalum oxide by 25 Å or more.

EXAMPLE 8

A washed clear glass plate having thickness of 2 mm was set in a sputtering device, and the air inside of device is discharged with pressure down to $10^{-6}$ Torr. Next, a titanium nitride film (first layer) is formed by approximately 300 Å by introducing nitrogen gas thereby increasing the pressure to $2\times10^{-3}$ Torr, and by sputtering a titanium target with the power density of 5.0 W/cm$^2$. Next, an oxide film containing tin and silicon (Sn:Si=50:50 in atomic ratio) (second layer) having the refractive index of 1.69 by approximately 50 Å by introducing the sputtering gas of a mixed gas of argon and oxygen (flow quantity ratio 1:1) under $2\times10^{-3}$ Torr, and by sputtering an alloy target of tin and silicon (50:50 in atomic ratio) with the power density of 7.8 W/cm$^2$.

The visible light transmittance of the low emissivity glass having composition of two layers obtained as above, was approximately 30%. In expressing the change of the reflection color tone of the glass surface due to the provision of the second layer, by the CIE calorimetric display, $\Delta X$ was $-0.0010$ and $\Delta Y$ was 0.0005. The change of the reflection factor owing to the second layer was approximately 0.5%. Therefore, the change of optical characteristic due to the provision of the second layer was very little. Next, the change of the visible light transmittance after Taber wear test wherein the sample underwent approximately 500 Taber rotations of the abrasion wheels CS-10F under a load of 500 g, was 5.9%.

EXAMPLE 9

A washed clear glass plate having thickness of 2 mm, was set in a sputtering device, and the air inside is discharged with pressure down to $10^{-6}$ Torr. Next, a stainless steel film (first layer) was formed by approximately 150 Å by introducing argon gas under $2\times10^{-3}$ Torr, and by sputtering a stainless steel target with the power density of 5.0 W/cm$^2$. Next, a TiN$_x$ film (second layer) was formed by approximately 250 Å under the same condition as in Example 8. Moreover, on top of the second layer, an oxide film containing tin and silicon (Sn:Si=50:50 in atomic ratio) (third layer) having the refractive index of 1.69, was formed by approximately 50 Å.

The visible light transmittance of the low emissivity glass having composition of three layers, obtained as above, was approximately 8%. In expressing the change of the reflection color tone of the glass surface due to the provision of the third layer, by the CIE calorimetric display, $\Delta X$ was $-0.0010$ and $\Delta Y$ was 0.0005. The change of the reflection factor due to the third layer was approximately 0.5%. Therefore, the change of the optical characteristic owing to the provision of the third layer was very little. Next, the change of the visible light transmittance of the sample wherein the sample underwent Taber wear of approximately 500 Taber rotations of the abrasion wheels CS-10F under a load of 500 g, was 6.1%.

EXAMPLE 10

A washed clear glass plate having thickness of 2 mm was set in a sputtering device, and the air inside the device was discharged with pressure down to $10^{-6}$ Torr. Next, a titanium oxide film (first layer) was formed by approximately 50 Å, by introducing a mixed gas of argon and oxygen (flow quantity ratio 1:1) thereby elevating the pressure to $2\times10^{-3}$. Torr, and by sputtering a titanium target with the power density of 5.0 W/cm$^2$. Next, a TiN$_x$ film (second layer) was formed by approximately 250 Å under the same condition as in Example 8. Furthermore, a titanium oxide film (third layer) was formed by approximately 100 Å on the second layer. Furthermore, an oxide layer containing tin and silicon (Sn:Si=50:50 in atomic ratio) (fourth layer) having the refractive index of 1.69 by approximately 50 Å under the same condition as in Example 8.

The visible light transmittance of the low emissivity glass having construction of four layers obtained as above, was approximately 35%. In expressing the change of the reflection color tone of the glass surface by the provision of the fourth layer in CIE calorimetric display, $\Delta X$ was $-0.0005$ and $\Delta Y$ was $-0.0005$, and the change of the reflection factor was approximately 0.5%. It was found that the change of the optical characteristic by the provision of the fourth layer was small. Next, the change of the visible light transmittance before and after the sample underwent Taber test wherein the sample received approximately 500 Taber rotations of the abrasion wheels CS-10F, was 4.9%.

EXAMPLE 11

A washed clear glass plate having thickness of 2 mm was set in a sputtering device, and the air inside the device was discharged with pressure down to $10^{-6}$ Torr. Next, a titanium nitride film (first layer) was formed by approximately 100 Å, by introducing nitrogen gas thereby elevating the pressure $2\times10^{-3}$ Torr, and by sputtering a titanium target with the power density of 5.0 W/cm$^2$. Next, a titanium oxide film (second layer) was formed by approximately 100 Å under the same condition as in Example 10. Furthermore, an oxide film containing tin and silicon (Sn:Si=50:50 in atomic ratio) (third layer) having the refractive index of 1.69 was formed by approximately 50 Å on the second layer under the same condition as in Example 8.

The visible light transmittance of the low emissivity film having construction of three layers obtained as above, was approximately 30%. In expressing the change of the reflection color tone of the glass surface due to the provision of the third layer of the CIE carolimetric display, $\Delta X$ was $-0.0005$ and $\Delta Y$ was $-0.0005$, and the change of the reflection factor was approximately 0.5%. Therefore, it was found that the change of the optical characteristic by the provision of the third layer was small. Next, the change of the visible light transmittance when the sample underwent Taber test wherein the sample received approximately 500 Taber rotations of the abrasion wheels CS-10F under a load of 500 g, was 4.5%.

EXAMPLE 12

A washed clear glass plate having thickness of 2 mm was set in a sputtering device, and the air inside the device was discharged with pressure down to $10^{-6}$ Torr, Next, a titanium oxide film (first layer) was formed by approximately 100 Å, by introducing a mixed gas of argon and oxygen (flow quantity ratio 1:1) thereby elevating the pressure to $2\times10^{-3}$ Torr, and by sputtering a titanium target with the power density of 5.0 W/cm$^2$. Next, a stainless steel film (second layer) was formed by approximately 100 Å under the same condition as in Example 9. Furthermore, a TiN$_x$ film (third layer) was formed by approximately 800 Å on the second layer under the same condition as in Example 8. Furthermore, an oxide film containing tin and silicon (Sn:Si=50:50 in atomic ratio) having the refractive index of 1.69 was formed by approximately 50 Å on the third layer under the same condition as in Example 8.

The visible light transmittance of the low emissivity film having composition of four layers obtained as above, was approximately 10%. In expressing the change of the reflection color tone of the glass surface by the provision of the fourth layer by CIE carolimetric display, $\Delta X$ was $-0.0001$ and $\Delta Y$ was $-0.0005$, and the change of the reflection factor was approximately 0.2%. Therefore, it was found that the change of the optical characteristic by the provision of the fourth layer was small. Next, the change of the visible light transmittance before and after the sample underwent Taber test wherein the sample received approximately 500 Taber rotations of the abrasion wheels CS-10F under a load of 500 g, was 3.8%.

EXAMPLE 13

A washed clear glass plate having thickness of 2 mm was set in a sputtering device, and the air inside the device was discharged with pressure down to $10^{-6}$ Torr. Next, a stainless steel film (first layer) was formed by approximately 50 Å, by introducing argon thereby elevating the pressure to $2\times10^{-3}$ Torr, and by sputtering a stainless steel target under the same condition as in Example 9. Next, a $TiN_x$ film (second layer) was formed by approximately 200 Å under the same condition as in Example 8. Furthermore, a titanium oxide film (third layer) was formed by approximately 200 Å under the same condition as in Example 10. Furthermore, an oxide film containing tin and silicon (Sn:Si=50:50 in atomic ratio) (fourth layer) having the refractive index of 1.69 was formed on the third layer by approximately 50 Å under the same condition as in Example 8.

The visible light transmittance of the low emissivity glass having composition of four layers obtained as above, was approximately 30%. In expressing the change of the reflection color tone of the glass surface by the provision of the fourth layer in CIE calorimetric display, $\Delta X$ was $-0.0005$ and $\Delta Y$ was $0.0005$, and the change of the reflection factor was approximately 0.5%. Therefore, it was found that the change of the optical characteristic by the provision of the fourth layer was small. Next, the change of the visible light transmittance before and after the sample underwent Taber test wherein the sample received approximately 500 Taber rotations of the abrasion wheels CS-10F under a load of 500 g, was 5.0%.

COMPARATIVE EXAMPLE 1

A washed gray glass plate having a thickness of 4 mm, was set in a sputtering device, and the air inside was discharged with pressure down to $10^{-6}$ Torr. Next, a tin oxide film (first layer) having the refractive index of approximately 2.0 was formed by approximately 710 Å, by introducing a mixed gas of argon and oxygen (flow quantity ratio 1:4) under $2\times10^{-3}$ Torr, and by sputtering a tin target with the power density of 4.7 W/cm$^2$.

A titanium nitride film (second layer) was formed by approximately 50 Å by switching the sputtering gas to a mixed gas of argon and nitrogen (flow quantity ratio 3:1), maintaining the degree of vacuum at $2\times10^{-3}$ Torr, and by sputtering a titanium target with the power density of 7.8 W/cm$^2$. A tin oxide film (third layer) was formed by approximately 710 Å under the same condition as in the first layer, after switching the sputtering glass again to a mixed gas of argon and oxygen (flow quantity ratio 1:4) under $2\times10^{-3}$ Torr.

The visible light transmittance of the low emissivity gas having composition of three layers obtained as above, was 70%. The solar ray transmittance thereof was reduced by approximately 11% by the coating. In expressing the change of the reflection color tone of the glass surface by CIE calorimetric display, $\Delta X$ was 0.0320 and $\Delta Y$ was $-0.0004$. The change of the reflection color tone of the coated surface was a value wherein $\Delta X=0.0546$ and $\Delta Y=-0.0037$. The reflection color tone was of red region color both on the glass surface and coated surface.

The change of the visible light transmittance after the sample underwent Taber test wherein the sample received 1,000 Taber rotations of the abrasion wheels CS-10F under a load of 500 g, was as large as $-4\%$. The changes of the visible light transmittance of the samples after they were immersed in 1 normal sulfuric acid and NaOH at 50° C. for 24 hours, were respectively increase by 3 to 4% and decrease by 7 to 9%, which were large values. It was possible to change the reflection color tone from red region color to blue region color by making a sample wherein the film thicknesses of the first layer and the second layer of tin oxide films were made thicker. However, the excitation purity of color of the reflection color tone was large and the yellowish tendency of the transmittant color tone was promoted, which was not preferable.

COMPARATIVE EXAMPLE 2

A washed bronze glass plate having a thickness of 4 mm, was set in a sputtering device, and the air inside was discharged with pressure down to $10^{-6}$ Torr. Next, an oxide film containing zirconium and silicon (Zr:Si=1:2 in atomic ratio) (first layer) having the refractive index of approximately 1.7, was formed by approximately 600 Å by introducing a mixed gas of argon and oxygen (flow quantity ratio 7:3) under $2\times10^{-3}$ Torr, and by sputtering an alloy target of zirconium and silicon (atomic ratio 1:2) with the power density of 9.4 W/cm$^2$.

A titanium nitride film (second layer) was formed by approximately 35 Å by switching the sputtering gas to a mixed gas of argon and nitrogen (flow quantity ratio 3:1), by maintaining the degree of vacuum to $2\times10^{-3}$ Torr, and by sputtering a titanium target with the power density of 7.8 W/cm$^2$. An oxide containing zirconium and silicon (Zr:Si= 1:2 in atomic ratio) (third layer) was formed by approximately 600 Å under the same condition as in the first layer, after the sputtering gas was switched again to a mixed gas of argon and oxygen (flow quantity ratio 7:3) under $2\times10^{-3}$ Torr.

The visible light transmittance of the low emissivity glass having composition of three layers obtained as above, was 70%. The solar ray transmittance thereof was reduced by approximately 10% by the coating. In expressing the change of the reflection color tone of the glass surface by CIE calorimetric display, $\Delta X$ was 0.0087 and $\Delta Y$ was 0.0062. The change of the reflection color tone of the coated surface was a value wherein $\Delta X=0.0040$ and $\Delta Y=0.0021$. The reflection color tone was extremely neutral both in the glass surface and in the coated surface.

The change of the visible light transmittance after the sample underwent Taber test wherein the sample received 1,000 Taber rotations of the abrasion wheels CS-10F under a load of 500 g, was as small as $-1.3\%$. The changes of the visible light transmittance after the samples were immersed in 0.1 normal sulfuric acid and NaOH at 50° C. for 24 hours, were both within ±1%, which is a small value.

However, the film forming rate of the oxide film containing zirconium and silicon, was about 38% as much as that of an oxide film containing tin and silicon, under the condition of the same applied power density, which is considerably low. Estimated tact hours in an in-line type sputtering device having a plurality of cathodes, were a little less than the time approximately two times as much as that in Example 1, and, therefore, the productivity thereof was extremely deteriorated.

COMPARATIVE EXAMPLE 3

A titanium nitride film was formed by approximately 100 Å on a washed clear glass having a thickness of 2 mm, under the same condition as in Example 1. Next, a low emissivity glass wherein a tin oxide (target: tin) was formed by 400 Å under the same condition as in the Comparative Example 1. Taber wear test was performed on the sample under the same condition as in Example 1. The change of the transmittance after 1,000 rotations of Taber test, was 4.4%. Although the width of change was improved by the protective film, compared with the protective coating having a thickness of 400 Å in Example 7, the width of change is considerably large.

COMPARATIVE EXAMPLE 4

A titanium nitride film was formed on a washed clear glass plate having thickness of 2 mm by 300 Å under the same condition as in Example 8. Taber wear test was performed on the sample under the same condition as in Example 8. The change of the visible light transmittance of the sample after Taber test of approximately 500 rotations, was 6.8%. Therefore, compared with that in Example 8, the width of change was large.

COMPARATIVE EXAMPLE 5

A stainless steel film (first layer) was formed on a washed clear glass plate having thickness of 2 mm by approximately 150 Å under the same condition as in Example 9. Next, a titanium nitride film (second layer) was formed by approximately 250 Å under the same condition as in Example 8. Taber wear test was performed on the sample under the same condition as in Example 9. The change of the visible light transmittance of the Taber test of approximately 500 revolutions, was 6.9%. Compared with that in Example 9, the width of change was large.

COMPARATIVE EXAMPLE 6

A titanium oxide film (first layer) was formed by approximately 50 Å on a washed clear glass plate having thickness of 2 mm, a $TiN_x$ film (second layer) was formed by approximately 250 Å on the first layer and a titanium oxide film (third layer) was formed by approximately 100 Å on the second layer, under the same condition as in Example 10. Taber wear test was performed on the sample under the same condition as in Example 10. The change of the visible light transmittance before and after the sample underwent Taber test wherein the sample received approximately 500 Taber rotations of the abrasion wheels CS-10F, was 5.5%. Therefore, compared with that in Example 10, the width of change was large.

COMPARATIVE EXAMPLE 7

A titanium nitride film (first layer) was formed by approximately 100 Å on a washed clear glass plate having thickness of 2 mm, and a titanium oxide film (second layer) was formed on the first layer by approximately 100 Å under the same condition as in Example 11. Taber wear test was performed on the sample under the same condition as in Example 11. The change of the visible light transmittance before and after the sample underwent Taber test wherein the sample received approximately 500 Taber rotations of the abrasion wheels CS-10F, was 5.0%. Therefore, compared with that in Example 11, the width of change was large.

COMPARATIVE EXAMPLE 8

A titanium oxide film (first layer) was formed by approximately 100 Å on a washed clear glass plate having thickness of 2 mm, a stainless steel film (second layer) was formed by approximately 100 Å on the first layer and a $TiN_x$ film (third layer) was formed by approximately 800 Å on the second layer, under the same condition as in Example 12. Taber wear test was performed on the sample under the same condition as in Example 12. The change of the visible light transmittance before and after the sample underwent Taber test wherein the sample received approximately 500 Taber rotations of the abrasion wheels CS-10F, was 4.4%. Therefore, compared with that in Example 12, the width of change was large.

COMPARATIVE EXAMPLE 9

A stainless steel film (first layer) was formed by approximately 50 Å on a washed clear glass plate under the same condition as in Example 13, a $TiN_x$ film (second layer) was formed by approximately 200 Å on the first layer and a titanium oxide film (third layer) was formed by approximately 200 Å on the second layer, under the same condition as in Example 13. Taber wear test was performed on the sample under the same condition as in Example 13. The change of the visible light transmittance before and after the sample underwent Taber test wherein the sample received approximately 500 Taber rotations of the abrasion wheels CS-10F, was 5.5%. Therefore, compared with that in Example 13, the width of change was large.

This invention realizes a low emissivity glass having an excellent heat ray shielding function while maintaining a neutral color tone. Furthermore, the solar ray energy transmittance can be reduced by 3 through 4% compared with the conventional dual layer system wherein an oxide film of zirconium is added with silicon or boron as a protective film.

This invention provides the productivity approximately twice as much as that in the three layer system of a composite oxide film of zirconium added with silicon or boron, having the same heat ray shielding function and the same neutral appearance. The target can be made by the cold isostatic press based on inexpensive tin. Therefore, the material cost can be maintained at a lower value.

Moreover when the invention is employed as a protective coating, it is possible to promote only the durability of a coated substance without considerably changing optical property of an underlayer thereof.

Since the composite oxide film containing tin and silicon of this invention, is excellent in the durability particularly in the wear resistance, it is possible to utilize the film not only for the low emissivity glass, but also for various protective coating materials for magnetic disk, lens, plastics and the like. Furthermore, since the refractive index thereof can be controlled by changing the ratio of tin and silicon, the film can be employed as an optical film material.

What is claimed is:

1. A method for forming a functional product, comprising the steps of:
   forming a functional film above a substrate; and
   forming a first oxide film above said substrate, by sputtering a target;
   wherein said first oxide film comprises tin and silicon, and said first oxide film has an atomic ratio of tin defined as Sn/(Sn+Si) in a range of 30–90%.

2. The method of claim 1, further comprising the step of forming a second oxide film above said substrate.

3. The method of claim 2, further comprising the step of forming a third oxide film above said substrate.

4. The method of claim 2, further comprising the step of forming a metal film between said functional film and said substrate.

5. The method of claim 2, wherein said second oxide film is formed below said functional film.

6. The method of claim 2, wherein said second oxide film comprises tin and silicon.

7. The method of claim 1, further comprising the step of forming a chemicalproof protective film above said first oxide film.

8. The method of claim 1, wherein said functional film comprises a material selected from the group consisting of a nitride, a carbide, a metal and an absorptive oxide.

9. The method of claim 1, wherein said functional film comprises a nitride selected from the group consisting of titanium nitride, zirconium nitride, hafnium nitride and chromium nitride.

10. The method of claim 1, wherein said first oxide film has an atomic ratio of tin defined as Sn/(Sn+Si) in a range of 40–90%.

11. The method of claim 1, wherein said first oxide film further comprises an element selected from the group consisting of zirconium, titanium, tantalum and bismuth.

12. The method of claim 1, wherein said substrate is glass.

13. The method of claim 3, wherein said sputtering of said target is with a power density of more than 9.4 W/cm$^2$.

14. The method of claim 1, wherein said sputtering is direct current sputtering.

15. The method of claim 1, wherein said first oxide film has a thickness of 10–1000 Å.

16. The method of claim 1, wherein said functional film has a thickness of from 20–100 Å.

17. The method of claim 1, wherein said first oxide film has a refractive index of 1.5–2.0.

18. The method of claim 1, wherein said functional product has a visible light transmittance of at least 70%.

19. The method of claim 1, further comprising the step of preparing said target by cold isostatic press method.

20. The method of claim 1, wherein said target is a metal target.

21. The method of claim 1, wherein said sputtering has a film forming rate at least 2.5 times as fast as a sputtering film forming rate of an oxide target containing zirconium and silicon in the atomic ratio of 1:2 under identical conditions.

22. The method of claim 1, wherein a power density during said sputtering is greater than a sputtering power density which will cause an oxide target containing zirconium and silicon, in the atomic ratio of 1:2, to arc.

* * * * *